US005144666A

United States Patent [19]

Le Van Suu

[11] Patent Number: 5,144,666

[45] Date of Patent: Sep. 1, 1992

[54] DECODER TO DECODE AN ENCRYPTED SOUND

[75] Inventor: Maurice Le Van Suu, Romainville, France

[73] Assignee: SGS-Thomson Microelectronics S.A., Gentilly, France

[21] Appl. No.: 591,680

[22] Filed: Oct. 1, 1990

[30] Foreign Application Priority Data

Oct. 2, 1989 [FR] France ........ 89 12844

[51] Int. Cl.$^5$ ........ H04K 1/04; H04N 7/167

[52] U.S. Cl. ........ 380/38; 380/13; 380/19

[58] Field of Search ........ 380/19, 38, 13

[56] References Cited

U.S. PATENT DOCUMENTS 4,148,063 4/1979 Chomet ........ 380/19
4,166,984 9/1979 Jenkins .
4,659,875 4/1987 Taurin et al. ........ 380/38

FOREIGN PATENT DOCUMENTS 85453 8/1983 European Pat. Off. .
0199410 10/1986 European Pat. Off. .
2203218 5/1974 France .
2624674 6/1989 France .

OTHER PUBLICATIONS

Patent Abstracts of Japan, vol. 9, No. 159, Jul. 4, 1985 (E-326) and JP-A-60 37824.

*Primary Examiner*—Stephen C. Buczinski
*Attorney, Agent, or Firm*—Pollock, VandeSande & Priddy

[57] ABSTRACT

Decoder for encrypted sound signals which are encrypted by modulating the sound signals on an alternating carrier signal having a frequency which is generally unknown to receiving parties. A modulator receives the encrypted sound signal as well as a second reference electrical signal. The reference signal is provided by an oscillator controlled through a phase locked loop. The phase locked loop includes a phase comparator connected through an exclusive OR logic gate and a sequential circuit to supply a control signal for the oscillator. The sequential circuit provides for a control signal polarity depending on the relative phase between the oscillator signal and input alternating carrier frequency signal. A signal divider is provided on each input of the comparator to require only comparison between phases of signals with frequencies lower than the carrier frequency signal and oscillator frequency signal. The circuit will provide the demodulation of the alternating carrier signal whose frequency has been maintained secret and is not known by unauthorized parties wishing to decode the signal.

10 Claims, 3 Drawing Sheets

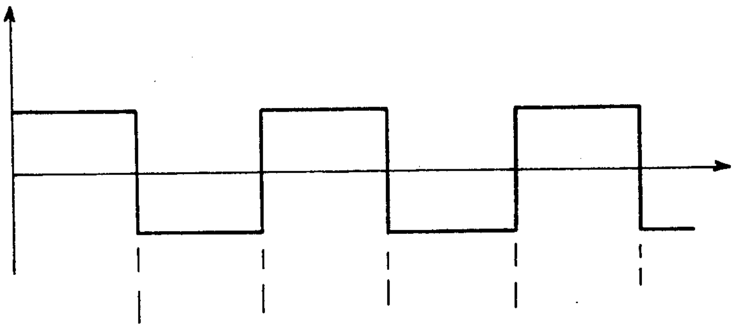
FIG. 3a
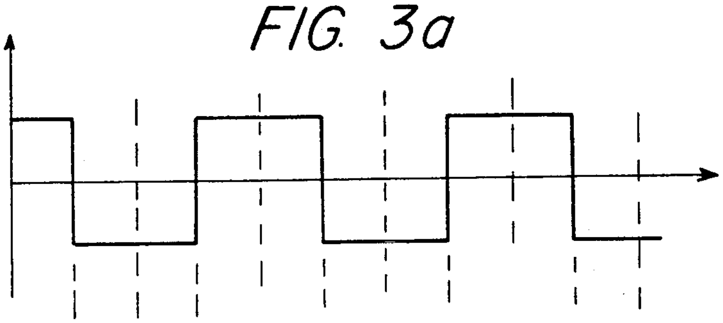
FIG. 3b
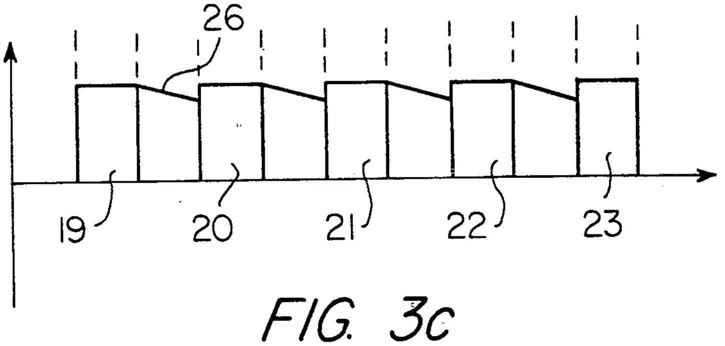
FIG. 3c
| W \ V | 0 | 1 | |
|---|---|---|---|
| 0 | N = 0<br>M = 1<br>P = 0 | N = 1<br>M = 0<br>P = 0 | |
| 1 | N = 0<br>M = 0<br>P = 1 | N = 1<br>M = 0<br>P = 0 | |
FIG. 5

DECODER TO DECODE AN ENCRYPTED SOUND

BACKGROUND OF THE INVENTION

1. Field of the Invention

An object of the present invention is a decoder to decode an encrypted sound, said sound being encrypted so that it cannot easily be decrypted or deciphered by listeners who, moreover, would not possess means to decipher it. These means are usually called decoders. A decoder finds application more particularly in the field of broadcasting where encrypted sound is used so that listening to subscriber broadcasting channels is reserved for subscribers. In the field of broadcasting, it more particularly concerns T.V. broadcasting.

2. Description of the Prior Art

Subscriber T.V. channels are known. These channels transmit radioelectric signals representing images that may be in either clear form or enciphered form. These images and sounds said to be in clear form when they can be received on any television set provided with at least an antenna and demodulation means. On the contrary, when the images and sounds are transmitted in enciphered form, only the owners of a decoder can demodulate the radioelectric signals transmitted, and then demodulate them successfully. The decoding in question is done normally after a high-frequency demodulation of the transmitted radioelectric signal.

For the depiction of the images, the encryption encoding concerns a variable delay in the appearance of the line video signal with respect to the standard line triggering synchronization of the television station. For the electrical signal representing the sound, the encryption concerns a modulation, usually of the SSB (single sideband) type, of a carrier by the sound to be heard. In other words, subscriber TV broadcasting channels transmit a sound which, once the high frequency (HF) demodulation has been done, contains or does not contain an additional amplitude modulation of the SSB type, depending on whether it is encrypted or not.

When the TV broadcasting channel transmits in clear form, for example when showing commercials, the transmissions are not encrypted. Under these conditions, everybody can receive and understand the commercial. On the contrary, when a leisure-time program or a news program is transmitted, the radioelectric signal is encrypted. Whereas viewers without decoders find that their image gets scrambled at the same time as the sound becomes inaudible, this change occurs without any problems for those who possess a decoder. In other words, the decoder is capable of recognizing the presence of the encryption and of carrying out its deciphering function.

As the additional modulation of the sound is simple in character, subscriber networks seek to complicate the task of fraudulent persons who would like to receive the sound clearly by making it undergo only an amplitude demodulation after the high frequency demodulation. These subscriber networks then do the encoding by using a signal with a carrier of unknown frequency. Moreover, this unknown frequency may vary in time during one and the same transmission. Thus, fraudulent persons cannot decode the sound by means of a simple amplitude demodulator.

However, this additional encoding by modulation with an unknown frequency of the sound must have a simple decoding by the decoders provided by the subscriber T.V. broadcasting channel. There is a known system with which these decoders are provided in order to make the sound audible to owners of the decoder, whatever may be the state of encryption. This system essentially has a microprocessor that performs a computation, on the received signal, of the frequency of the carrier. This microprocessor then controls an oscillator frequency so that the oscillator emits a reconstituted carrier signal where the frequency of the carrier is equal to that of the unknown carrier of the encrypted sound. The drawback of such a system is that it requires the presence of a microprocessor and that a microprocessor such as this, although its use is becoming widespread and although it costs little in itself, increases the cost of the decoder. It is therefore desire to make a decoder that costs less while at the same time being functional to an equally high degree. In effect, since a microprocessor can be programmed, it accepts a certain programmability of the demodulation parameters.

Moreover, and because a phase of demodulation by a single signal, even if the frequency of this signal is unknown, does not sufficiently dissuade fraudulent persons with ingenuity, it has become the practice to make sound with single sideband modulation undergo a second additional modulation. This second modulation is also a single sideband modulation but is at another carrier frequency. This other carrier frequency, for its part, is a fixed frequency so as not to excessively complicate matters.

The result is that, ultimately, the sound may be modulated three times; once, the sound modulates the fixed frequency carrier signal, at a second time the result of this first modulation modulates the carrier with a frequency said to be unknown and, at a third time, the signal coming from this second modulation achieves a frequency modulation of an HF carrier so that it can be transmitted radioelectrically. This justifies the presence of the microprocessor which should be capable of telling the difference not between two situations, clear transmission and encrypted transmission, but three situations, clear, simply encrypted and doubly encrypted transmission. Although such a microprocessor appears then to be almost indispensable, the invention succeeds in doing without it.

In the invention, to overcome the drawbacks referred to, it is proposed to achieve decoding and demodulation of the signal modulating the carrier of unknown frequency in a demodulator that receives, firstly, the encrypted signal, i.e. modulating this unknown frequency and, secondly, a signal emitted by a voltage-controlled oscillator. The signal emitted by the oscillator results from a phase lock loop in which a phase comparison is made between the encrypted signal (received carrier) and a signal corresponding to the (reference) demodulation signal in this demodulator. When the two phases are identical (i.e. when the phase and the frequency of the reference signal are equal to the phase and to the frequency of the encrypted signal to be demodulated), the oscillator is kept at its demodulation frequency, and it changes it only when the modulation frequency of the encrypted signal itself changes.

SUMMARY OF THE INVENTION

An object of the invention,,therefore, is a decoder to decode an encrypted sound, where the encryption of the sound being done by the modulation, by of the sound, of an alternating signal oscillating at an unknown frequency of a carrier signal the decoder including a demodulator, the demodulator receiving, firstly, an electrical signal representing encrypted sound and, secondly, an alternating electrical signal, the frequency of which is that of the unknown carrier. The decoder delivers, at an output, a demodulated electrical signal that represents the sound, said decoder including an oscillator controlled by a phase lock loop, said phase lock loop including a phase comparator, to produce an electrical signal representing the unknown carrier, said phase comparator receiving as an input, firstly, an electrical signal representing the carrier of the encrypted sound and, secondly, an electrical signal coming from the output of the oscillator and corresponding to the signal representing the unknown carrier.

DESCRIPTION OF THE FIGURES

The invention will be understood more clearly from the following description and from the accompanying figures. These figures are given purely by way of example and in no way restrict the scope of the invention. Of these figures.

FIGS. *2a* and *2b* show frequency spectra of signals encrypted and simply decoded by using the decoder according to the invention;

FIGS. *3a* to *3c* show timing diagrams of signals coming into play in the circuit of the invention;

FIGS. *4a* to *4a* show spectra of signals that are decoded with the decoder of the invention but which have undergone two previous encoding modulations;

FIG. 5 shows the truth table of a multiplexing circuit enabling the broadcasting of sound as a function of the processing operations that it has had to undergo, depending on its state of encryption.

DETAILED DESCRIPTION OF THE INVENTION

Figure 1:
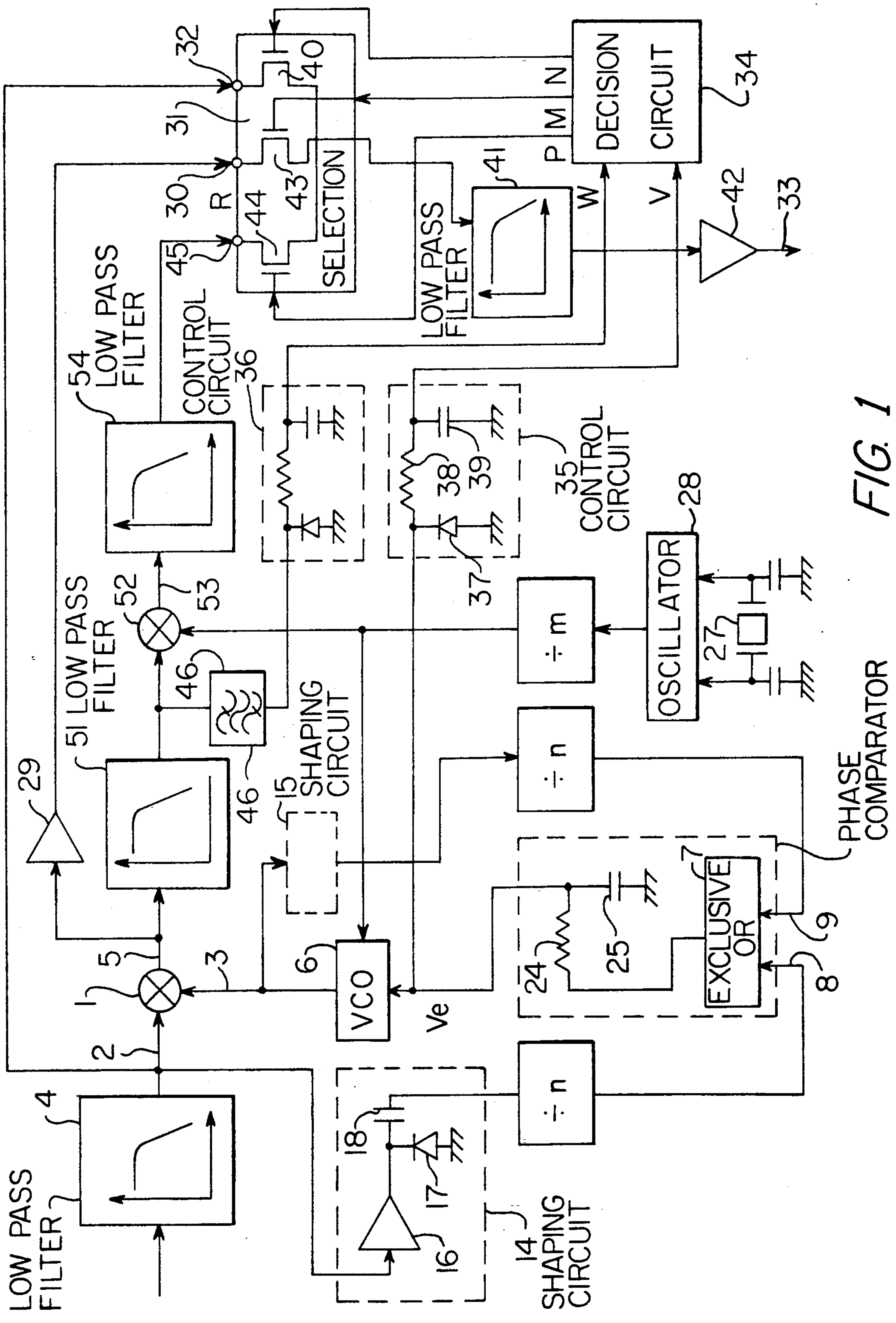
FIG. 1 gives a schematic view of a decoder of encrypted sound according to the invention.
Figure 2A:
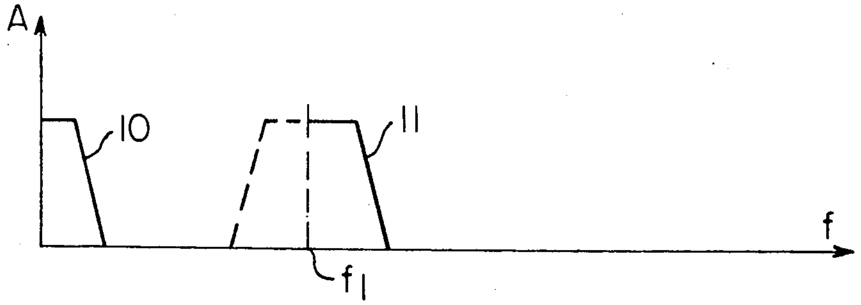
Figure 2B:
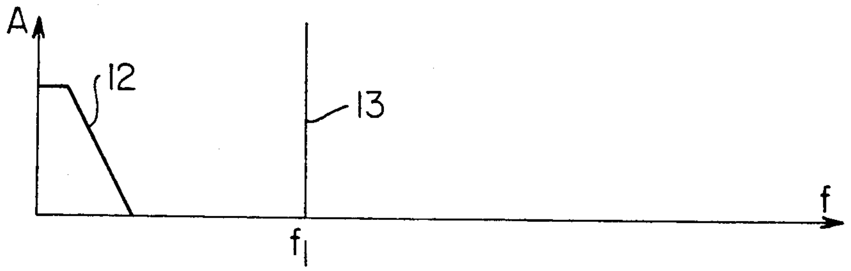

FIG. 1 shows a schematic view of a decoder according to the invention. This decoder includes a demodulator 1 including two inputs, respectively 2 and 3. A first input 2 receives an electrical signal representing encrypted sound. In practice this signal, when it is effectively encrypted (i.e. modulated by a single sideband or SSB type modulation), is transmitted to the input 2 by means of a low-pass filter 4 after a high frequency demodulation. At its second input 3, the demodulator receives an AC electrical signal, the frequency of which is that of the unknown carrier. The demodulator 1 delivers a demodulated electrical signal at its output 5. This demodulated electrical signal represents sound once the decrypting (the demodulation) has been done. Preferably, the demodulator is a product type demodulator. According to the essential characteristic of the invention, the demodulator is connected to a voltage-controlled oscillator, 6. The oscillator 6 is voltage controlled by a phase lock loop comprising essentially a phase comparator 7. The phase comparator 7 produces an error signal $V_e$ that represents, as a function of the time and the state of control of the oscillator 6, the frequency of the unknown carrier. The comparator 7 has two inputs, 8 and 9 respectively. At a first input 8, it receives an electrical signal representing encrypted sound. At a second input 9, it receives an electrical signal coming from the output of the oscillator and corresponding to the signal representing the unknown carrier.

This circuit works as follows. FIG. *2a* shows the frequency curve of a signal 10, namely the sound signal to be received. This sound signal has been used for the amplitude modulation of a signal at an unknown carrier frequency (shown in dashes) with a frequency $f_1$ so as to give a spectrum 11. During the demodulation in the demodulator 1, if a signal at the frequency $f_1$ is introduced into the input 3, a signal will be re-obtained at the output 5: the spectrum of this signal obtained at the output 5 is represented in FIG. *2b* in baseband by the profile 12. In fact, the output signal from the demodulator is considered to have not only the useful spectral components of the sound, but also a component at the demodulation frequency. When the demodulation frequency has been precisely the frequency $f_1$, this spectral component 13 appears under $f_1$.

Before being introduced at the inputs 8 and 9 of the phase comparator 7, the signals available at the input 2 and the input 3 of the demodulator 1 are shaped by the circuits respectively 14 and 15 of the same nature. The circuit 14, which is the only one shown in detail, has a cascade-mounted amplifier 16 followed by a limiter 17. In practice, the limiter 17 may consist of a single diode. The diode is parallel-connected between the output of the amplifier 16 and the ground. A capacitor 18 is placed in series with the output of the amplifier 16. This capacitor 18 makes it possible to eliminate the continuous component. Under these conditions, at the output of the circuit 14, the available signal has the shape of the signal shown in FIG. *3a*. It is a square-wave signal, the cyclical ratio of which is equal exactly to 1. Clearly, other forms of the shaping circuit 14 can be contemplated, and this particular form is given herein only in order to simplify the explanation.

Initially, it may be assumed that the signals coming from the shaping circuits 14 and 15, seen respectively in FIGS. *3a* and *3b*, are admitted directly to the inputs of the phase comparator 7. In one example, this phase comparator 7 has, by virtue of its principle, an exclusive-OR gate. In one example, the output of this gate is equal to zero, when the two signals at its inputs are both negative or both positive. In the other cases, the output of the exclusive-OR gate is equal to one.

FIG. *3c* shows pulses 19–23 during which the output of the exclusive-OR gate of the comparator 7 has gone to 1.

The output of the exclusive-OR gate is connected to an integrator circuit 24–25. In a simplified example, the integrator circuit 24–25 includes a resistor 24 in series and a capacitor 25 connected between the output of the resistor 24 and the ground. The output of the integrator circuit is taken at the midpoint of this RC circuit. The time constant of this RC circuit is greater than the period of the pulses 19–23. It is, for example, ten times greater. The integrator circuit 24–25 converts the pulse signals 19 to 23 into a substantially flat signal 26 (FIG. *3c*). This signal 26 is the signal $V_e$, the error signal admitted at the input of the oscillator.

In examining the FIGS. *3a* and *3b*, it can be seen that the greater the difference, in phase between the signals admitted at the inputs 8 and 9 of the comparators the higher is the signal 26 and the greater will be the speed with which the oscillator 6 approaches the frequency $f_1$ that it must attain. When the signal measured at the output of the demodulator is at a frequency equal to the frequency $f_1$, and when its phase is also the same as that of the signal introduced at the input 2 of the demodulator, the exclusive-OR gate receives, at its input, signals that are equal at the same time to 0 or equal at the same time to 1. This signal integrated in the integrator 24–25 is transmitted as a zero error signal: the oscillator 6 remains at the frequency that it has attained.

So as to take account of the possibility that the frequency of the signal at input 3 is greater than the frequency of the signal admitted at the input 2, the exclusive-OR gate is slightly different. It is, in fact, cascade-mounted with a sequential circuit that is designed to determine which of the two signals (the one coming from the input or the one coming from the output of the demodulator reaches first. This makes it possible, through the direction of the phase lead or phase delay thus detected, to give a positive or negative significance to the signal $V_e$. Under these conditions, the signal $V_e$ remains at the frequency $f_1$. Circuits including both the exclusive-OR circuit and the sequential circuit thus described are known in the prior art as PLL (phase lock loop) circuits and are used to set up phase lock loops. In one example, a PLL circuit such as this uses the Micro Power Phase Locked Loop CD 40–46 A made by the firm RCA.

In practice, the frequency $f_1$ is of the order of about ten KHz. This leads to maximum possible phase differences, expressed in temporal terms, of the order of 40 microseconds. When the locking starts, when the inherent frequency of the oscillator 6 and the unknown frequency are very far from each other, it is possible that, as it moves towards a meeting point with the unknown frequency $f_1$, the oscillator will receive error signals having a given polarity and then a reverse polarity depending on whether the sequential circuit thus described has detected a change in phase of one signal or of another signal beforehand. The result thereof may be an erratic operation of the oscillator 6. To prevent such a situation, it is preferred to use a division, by n, of the frequencies of the signals admitted at the inputs 8 and 9 of the comparator 7. This makes it possible, ultimately, for situations of phase reversal to be experienced less frequently. In other words the lacking in, by the oscillator 6, of the frequency $f_1$ will be faster and smooth at the same time. In practice, the values n are preferably of the order of 10 for the application indicated.

The voltage-controlled oscillator 6 is normally not stable and should, in practice, be driven by a quartz crystal 27 connected to the terminals of an oscillator 28. The oscillator 28 is itself connected to a divider by m. This is made necessary by the fact that quartz crystals produce very high inherent frequencies which are manifestly distant from the frequency $f_2$ of the order of 12 KHz around which it will be necessary to drive the voltage-controlled oscillator 6.

The signal delivered by the output 5 of the demodulator is sent, by means of a correction amplifier 29, to an input 30 of a selection circuit 31. The selection circuit 31 further includes another input 32 that receives the signal present at the input 2 of the demodulator 1. The selection circuit is designed to deliver the sound in clear form at the output 33 of the decoder according to the invention. The selection circuit 31 includes notably switches enabling the changing of the non-modulated signal or of the signal that has undergone the first demodulation by $f_1$. The selection circuit 31 receives commands N, M or P emitted by a decision circuit 34. The decision circuit 34 receives the electric signals representing the state of encryption, double encryption or absence of encryption of the sound signal received.

In one example, the decision circuit 34 is a decoder similar to an address decoder. It can equally well be constituted by a matrix of diodes or by another cabled circuit. The signals representing these states are signals V and W, prepared respectively by control circuits such as the circuits 35 or 36. These control circuits 35 and 36 are given herein purely by way of indication and solely in order to explain the function that they are supposed to fulfill. Other circuits are easily within the scope of those skilled in the art. In one example, the circuit 35 is interposed between the input of the oscillator 6 and the input of the decision circuit 34 which receives the signal V. The signal V is a logic signal: it is supposed to be at 1 constantly when the sound is transmitted in clear form by the television broadcasting channel. When this case occurs, no carrier can be detected therein and, after division by n, the frequency of this low-frequency signal (in base band) is so low that it can be assumed that it is zero. Under these conditions, the phase comparator 7 receives, firstly, a signal prepared by the oscillator 6 which gets fixed, by default, on the driving frequency delivered to it by the oscillator 28 and, secondly, a constant signal. In other words, the phase comparator delivers a signal that oscillates between +1 and −1 at the inherent frequency of oscillation of the oscillator 6.

This signal oscillating between +1 and −1 is detected in the circuit 35 by a diode 37, and is filtered by a circuit formed by a resistor 38 and a capacitor 39. Under these conditions, the output of the circuit 35 is at 1. By contrast, when the sound signal modulates the unknown carrier in amplitude, and when the phase lock loop plays its role, the error signal $V_e$ is null. Consequently, the output signal of the control circuit 35 is null too: V = 0.

Depending on the value of the commands V and W that it receives, the decision circuit 34 transmits commands by N, M and P indicated by the decision table of figure 5. When V is equal to 1, N equals 1 and M and P equal 0. In this case, the signal N that is introduced into the control gate of an N type transistor 40 of the selection circuit 31 permits the passage, through this selection circuit 31, of the clear signal available at the input 32 of this circuit. This clear signal is then transmitted to a low-pass signal 41 which is designed to prevent cross-talk. The low-pass filter is linked to an output amplifier 42.

Figure 4A:
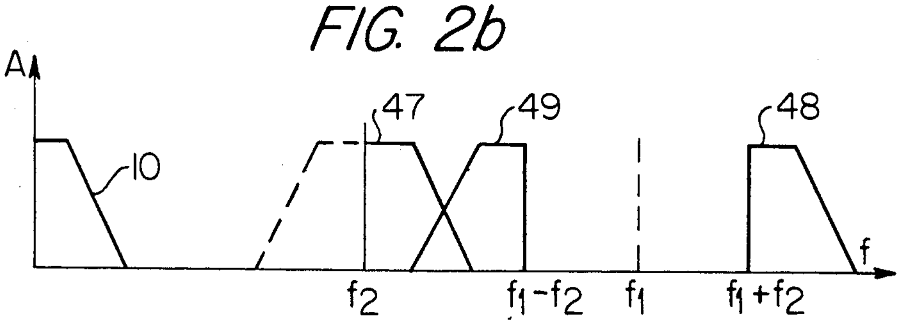
Figure 4B:
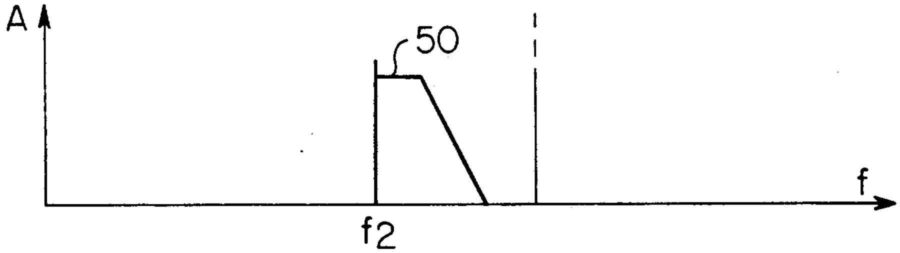
Figure 4C:
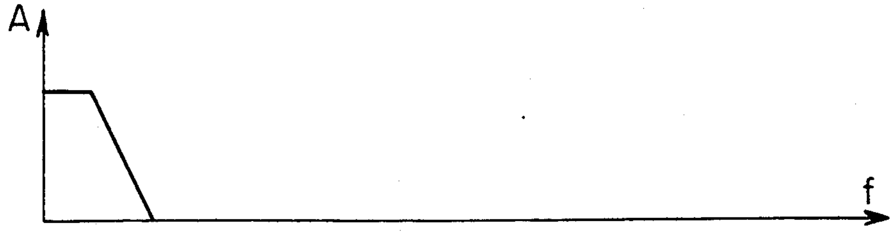

FIGS. 4*a* to 4*c* show the spectral graph of a sound signal that has undergone a double modulation and has to undergo a double demodulation. As indicated above, the double demodulation is not, however, excessively complicated. It has to be governed by a number of constraints. For example, it is accepted that the known carrier frequency should be in a certain range, for example between 12 Khertz and 14.8 Khertz. Furthermore, since the frequency $f_2$ is known and since even, in a preferred example, it is equal to 12.8 Khertz, the frequency $f_1$, in case of double demodulation, has to be in another range. In a corresponding example, it must be between 24.8 Khertz and 27.6 Khertz. Thus, a spectral component is made to appear at a spectral frequency $|f_1 - f_2|$ which is also within the same first range of 12 to 14.8 Khertz. Whatever may be the order in which the two modulations are done for the encryption, the first operation performed is the demodulation by the unknown carrier $f_1$ (when it is a single modulation) or by a combination of the unknown carrier ($|f_1 - f_2|$ in the other case). Thus, the signal 10, in FIG. 4*a*, modulating firstly a carrier at the frequency $f_2$ may produce a modulated signal 47. The modulated signal 47 modulating the unknown carrier $f_1$ produces, firstly, a doubly modulated signal with one component 48 that is located out of band and another component 49 that is located in the useful band. At, reception, with the low-pass filter 4, the signal component 48 is eliminated and the signal component 49 is demodulated.

Naturally, the voltage-controlled oscillator 6 gets locked into the frequency $|f_1 - f_2|$. It therefore demodulates the modulated signal component 49, and at the output 5, there is a demodulator 1 of a once-demodulated signal 50. This once-demodulated signal is located around the frequency $f_2$. With a low-pass filter 51 placed at output of the modulator 1, the unnecessary high frequency components resulting from this first demodulation are eliminated. By means of a second demodulator 52, placed downline of the filter 51, receiving, firstly, the signal 50 delivered by the filter 51 and, secondly, a carrier signal at the frequency $f_2$ prepared by the oscillator 28, the final demodulation is done so as to retrieve the sound in clear form at the output 53 of the demodulator 52.

Before it is introduced into the input 45 of the selection circuit 31, the signal delivered by the output 53 is itself filtered in a filter, preferably with commutated capacitors 54, in order to remove the noise of demodulation and in order to avoid band folding problems.

When V is null, N is obligatorily null and the commands M and P then take mutually reverse values to permit, by their application to N type transistor gates 43 and 44 respectively, the passage of a singly demodulated signal available at the input 30 or the passage of a doubly demodulated signal available at an input 45 of the selection circuit 31. The signal W too is prepared, for example, by a control circuit 36 in relation with a bandpass filter 46 centered on the frequency $f_2$. The bandpass filter brings out the high-frequency components that would exist if the signal had been doubly modulated and if, consequently, high-frequency components still existed after the first demodulation. This signal is detected in the same way as in the control circuit 36 and the signal W is equal to 1 when there has been double modulation or it is equal to 0 when there has been no double modulation.

The system described up until now enables a single demodulation or an automatic double demodulation so that the listener does not have to take action at any particular place. It enables double demodulation or single demodulation even when one of the modulations is at the frequency of the unknown carrier. It can be seen that it uses no microprocessor and that, consequently, it is less costly to make than the prior art system referred to.

What is claimed is:

1. A decoder to decode an encrypted sound signal, which has been encrypted by modulating said sound signal on an alternating carrier signal at a frequency which is unknown to receiving parties to prevent unauthorized reception, comprising:
   - a demodulator, receiving a first electrical signal representing the encrypted sound signal and receiving a second alternating electrical signal of the frequency which is that of the alternating carrier signal, said demodulator providing at an output thereof a demodulated electrical signal that represents said sound signal;
   - an oscillator controlled by a phase locked loop, including a phase comparator, to produce said second alternating electrical signal representing the carrier signal of an unknown frequency;
   - said phase comparator receiving at a first input an electrical signal representing the carrier of the encrypted sound and at a second input, an electrical signal from the oscillator, said phase comparator producing a signal for controlling said oscillator frequency to derive the second alternating signal;
   - the phase comparator including;
   - an exclusive OR logic gate connected with a sequential circuit means for determining which of said electrical signals reaches said phase comparator first, whereby a relative polarity for said signal controlling said oscillator is determined; and
   - a signal divider connected to said phase comparator first and second inputs for frequency dividing signals applied to said inputs, whereby said phase comparator only compares phases of signals with lower frequencies than said carrier signal frequency and said oscillator frequency.

2. A decoder according to claim 1, wherein the frequency-controlled oscillator is driven by a signal at a fixed and known frequency, the frequency of which is of the same order as the unknown frequency of the carrier signal.

3. A decoder according to claim 1 comprising a circuit for the shaping of the electrical signal representing the encrypted sound, connected tc the output of the comparator and connected to a terminal for supplying the electrical signal representing the encryted sound.

4. A decoder according to claim 1 or 2, wherein the phase comparator is connected to the frequency-controlled oscillator by means of an integrator, having a time constant which is at least twice as great as the maximum duration of the period of said unknown carrier signal.

5. A decoder according to claim 1 or claim 2, further comprising a selection circuit connected to two control circuits to connect outputs of the decoder to a sound diffusion circuit, said control circuits providing control signals corresponding to the encryption characteristics of the encrypted sound.

6. A decoder according to claim 2, wherein a second demodulator demodulates the sound signal which has been further encrypted by second modulation on a second signal having a frequency equal to the value of the frequency of the signal of a fixed and known frequency that drives the oscillator.

7. A decoder circuit to decode an audio signal modulated on at least one carrier signal having a frequency which is unknown to receiving parties to prohibit unauthorized listening comprising:
   - a first demodulator means for receiving said at least one carrier signal of an unknown frequency;
   - a second demodulator means for receiving a demodulated signal produced by said first demodulator;
   - a voltage controlled oscillator supplying a reference signal to said first demodulator;
   - a phase comparator for receiving said at least one carrier signal, and a signal from said voltage controlled oscillator for providing a signal to said voltage controlled oscillator to establish a frequency of operation for said oscillator;
   - a second oscillator for providing a reference signal to said second demodulator;
   - selection circuit means connected to receive at least two signals from the group of signals including a signal from said first demodulator means, a signal from said second demodulator means, and said carrier signal having an unknown carrier frequency; and decision circuit means connected to receive input signals comprising a signal from said first demodulator means and a signal from said phase comparator circuit, said decision circuit enabling said selection circuit means to provide one of said at least two signals as said audio signal.

8. The decoder circuit of claim 7 further comprising first and second limiter circuits connecting said phase comparator to said selection circuit, and connecting said first demodulator means to said selection circuit.

9. The decoder circuit of claim 8 further comprising frequency dividing means connected to said phase comparator for frequency dividing said at least one carrier signal and said voltage controlled oscillator signal.

10. A decoder circuit according to claim 7, wherein said second oscillator supplies a signal to said voltage controlled oscillator.

* * * * *